US006471224B1

(12) United States Patent
Ziech

(10) Patent No.: US 6,471,224 B1
(45) Date of Patent: Oct. 29, 2002

(54) KINGPIN INDEPENDENT FRONT SUSPENSION

(75) Inventor: James Ziech, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/469,181

(22) Filed: Dec. 21, 1999

(51) Int. Cl.[7] .................................................. B62D 3/00
(52) U.S. Cl. ................... 280/93.512; 180/252; 180/253
(58) Field of Search .............. 280/93.512; 180/252–258

(56) References Cited

U.S. PATENT DOCUMENTS 1,493,311 A 5/1924 Woolson
2,070,289 A 2/1937 Marmon et al.
2,370,098 A 2/1945 Weiss
3,521,900 A 7/1970 Sakai
3,749,415 A 7/1973 Sampatacos
3,981,513 A * 9/1976 Erskine .................... 280/95 R
4,190,265 A 2/1980 Goodbary et al.
4,377,298 A * 3/1983 Finn et al. .................. 280/663
4,553,624 A * 11/1985 Yoshii ........................ 180/250
4,657,271 A 4/1987 Salmon
4,842,296 A 6/1989 Kubo
4,964,651 A 10/1990 Kubo
4,986,565 A 1/1991 Hajto
5,022,673 A * 6/1991 Sekino et al. ............... 280/673
5,188,382 A 2/1993 Seiler
5,219,176 A 6/1993 Mitchell

* cited by examiner

*Primary Examiner*—Eric Culbreth
*Assistant Examiner*—L. Lum
(74) *Attorney, Agent, or Firm*—Liniak, Berenato & White

(57) ABSTRACT

A steering knuckle assembly for a heavy duty independent front suspension comprises an upper kingpin support and a lower kingpin support for connecting the knuckle to the upper and lower control arms, respectively. The shock absorber member extends from the vehicle frame to either the lower control arm or the lower kingpin support member. The bolted connection of the upper kingpin support member allows an adjustable kingpin caster angle as opposed to a fixed caster angle provided in a typical kingpin steer independent front suspension axle. This concept allows the angle to be tuned to suit each application of the axle without retooling the components. Additionally, the invention eliminates the bulky upright connecting member of the conventional design.

12 Claims, 7 Drawing Sheets

100
110
112a
112a
116
130
150
170
120
160
146
124
122
144
142

112a
110
116
142
130
170
150
120
160
124
122
112
144
140
148

KINGPIN INDEPENDENT FRONT SUSPENSION

FIELD OF THE INVENTION

The present invention provides an improved heavy duty independent front suspension assembly associated with non-driving axle, wherein the kingpin is attached to the suspension through a unique two piece kingpin joint member.

DESCRIPTION OF RELATED ART

Heavy duty independent front suspension (non-driving) assemblies have used the knuckle and king pin components from solid beam axle designs and these suspension assemblies have added a large upright member to attach the kingpin to the suspension. The upright member ties the kingpin to the suspension control arms.

The conventional upright member known in the prior art is illustrated in FIGS. 1 and 2, wherein the knuckle and wheel end 10 engages an upright connecting member 12 through a kingpin 14. The upright connection member 12 connects the wheel end 10 to the vehicle through the upper 'A' or control arm 16 and lower 'A' or control arm 17. The bulky upright member 12 also mounts the air bag 18 and resilient shock absorber and/or strut member 19.

These conventional suspension assemblies result in increased weight, cost and complexity. Moreover, the bulky upright member provided by the conventional heavy duty independent suspension systems occupies space needed for brake and steering components. Additionally, there is no provision for adjustment of the caster angle.

The need therefore exists for an improved suspension assembly having reduced weight, cost and complexity; while freeing up space taken by the bulky systems known in the prior art.

SUMMARY OF THE INVENTION

The present invention provides an improved suspension assembly having reduced weight, cost and complexity; while freeing up space taken by the bulky systems known in the prior art.

The invention replaces the conventional upright connecting member with two smaller lighter pieces attached to the suspension and linked together by the kingpin. The kingpin thus serves the function previously served by the bulky upright connecting member.

The present invention also provides a bolted joint in the upper kingpin support member and the replacement of the lower outboard tapered roller bearing pivot with a ball joint. The upper kingpin support member is attached to the knuckle through the bolted joint connection and the lower control arm is attached to the lower kingpin support member through the ball joint connection. The spring member extends from the vehicle frame to either the lower control arm or the upper kingpin support or the lower kingpin support member.

A two-piece bolted joint in the upper king pin support and upper control arm which can be adjusted fore and aft allows an adjustable kingpin caster angle as opposed to a fixed caster angle provided in a typical kingpin steer independent front suspension axle. This concept allows the angle to be tuned to suit each application of the axle without retooling the components and allows an adjustment for manufacturing tolerances or field maintenance. Additionally, the invention eliminates the bulky upright connecting member to thereby lower the overall weight and improve the overall axle packaging.

These and other advantages of the invention will become apparent with reference to the attached drawings and the following description of the best mode for achieving the objectives of the invention.

BRIEF DESCRIPTION OF THE INVENTION

DESCRIPTION OF THE PREFERRED EMBODIMENTS

Figure 1:
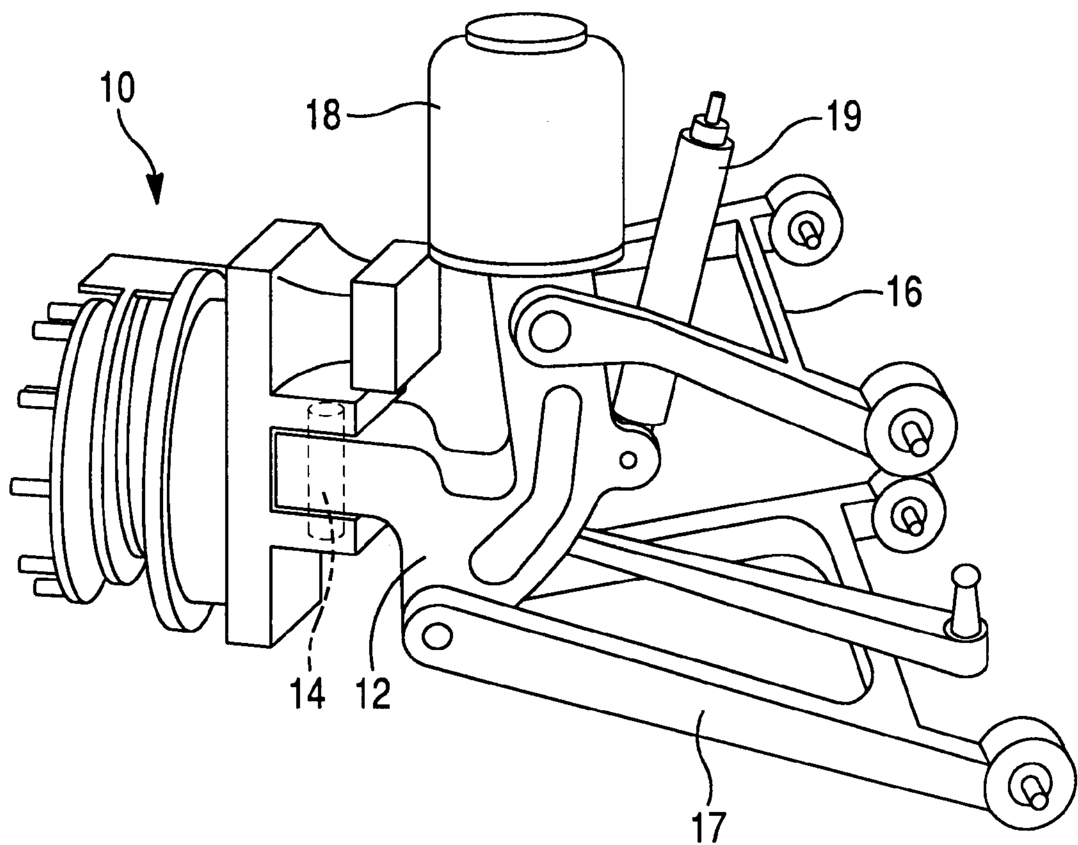
FIG. 1 is a perspective view of the conventional heavy duty king pin independent front suspension system including a central upright connecting member.
Figure 2:
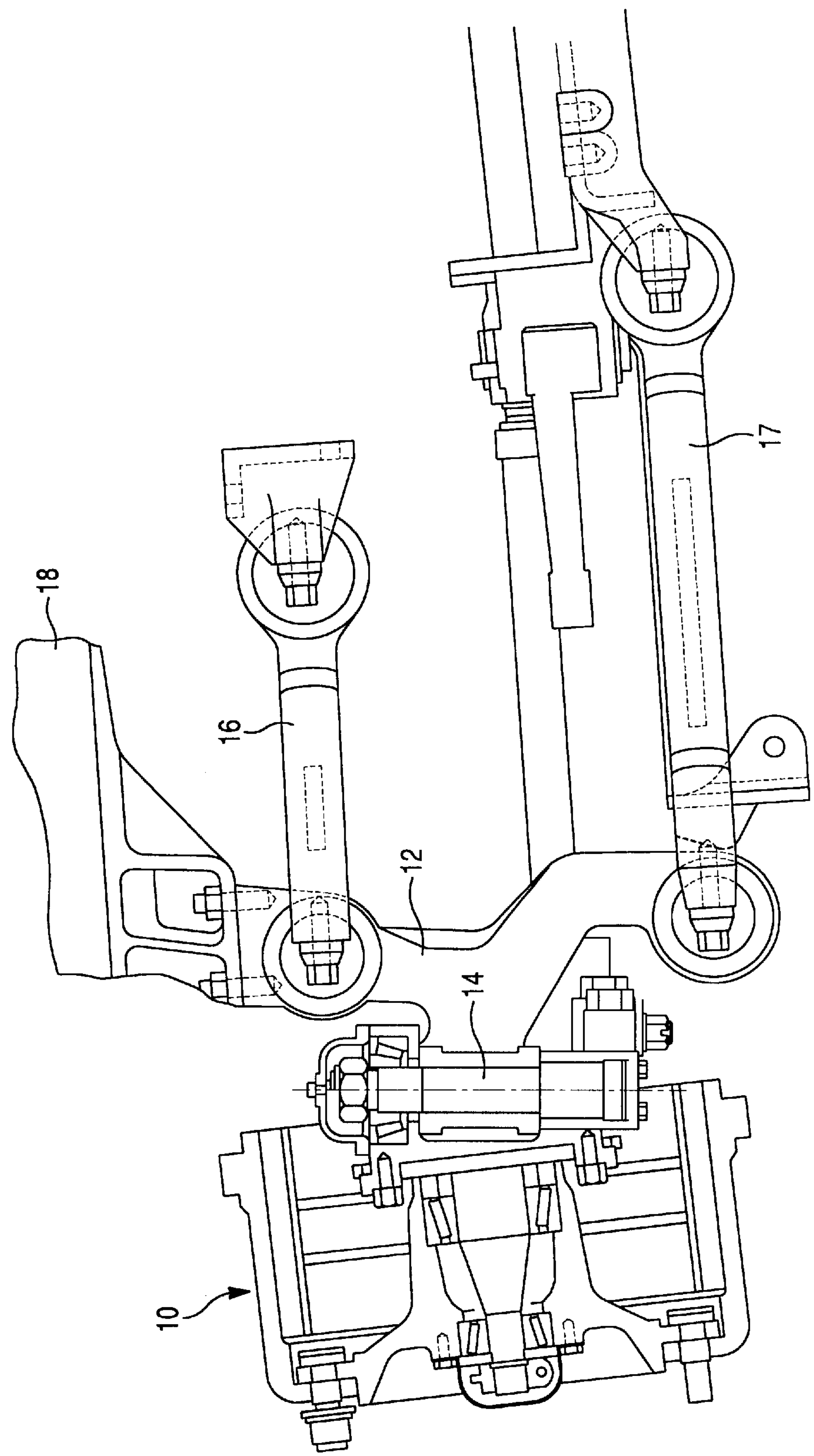
FIG. 2 is a front view of another conventional suspension system similar to that shown in FIG. 1.
Figure 3:
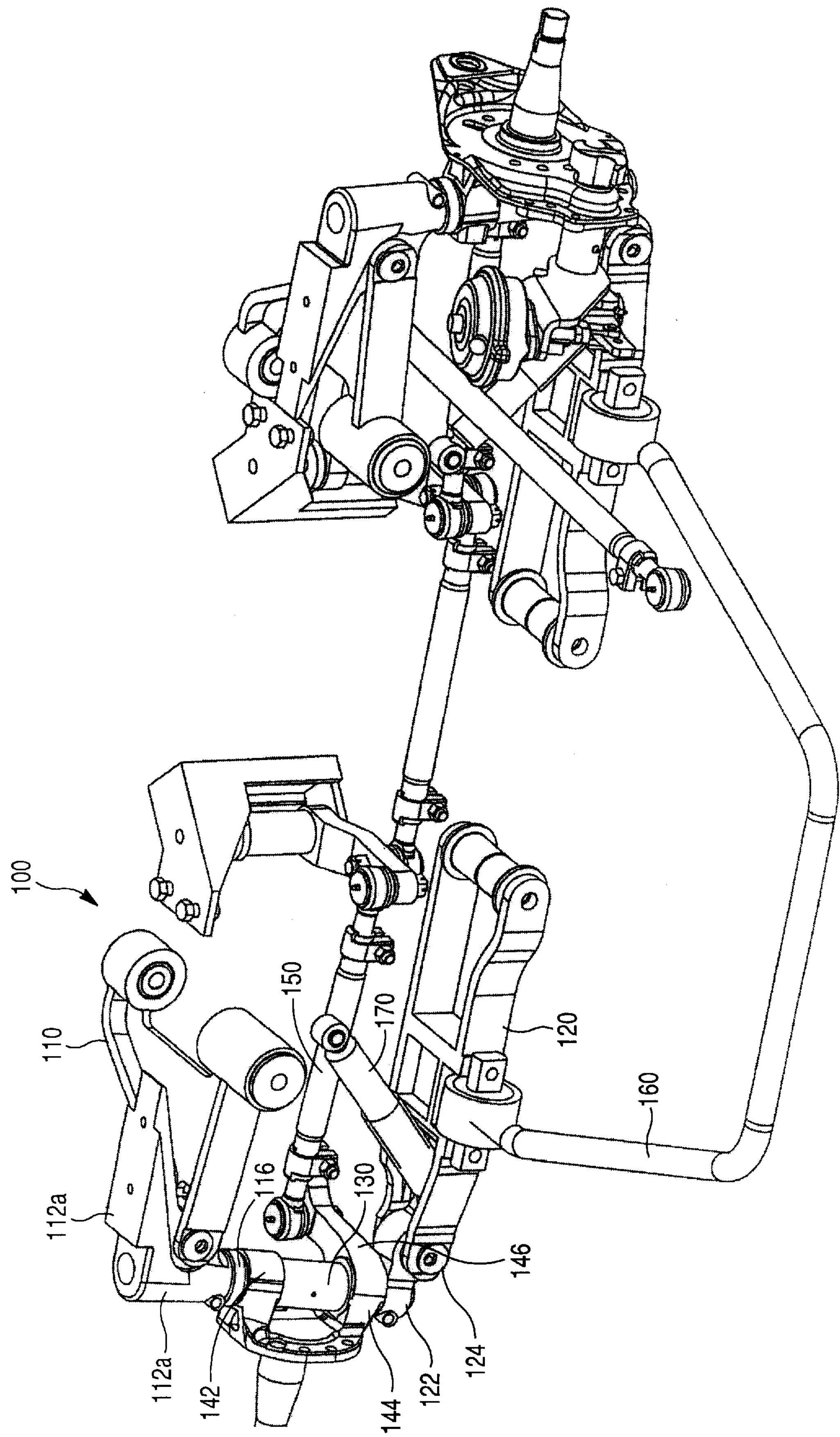
FIG. 3 is a perspective view of the independent front suspension system according to this invention.
Figure 5:
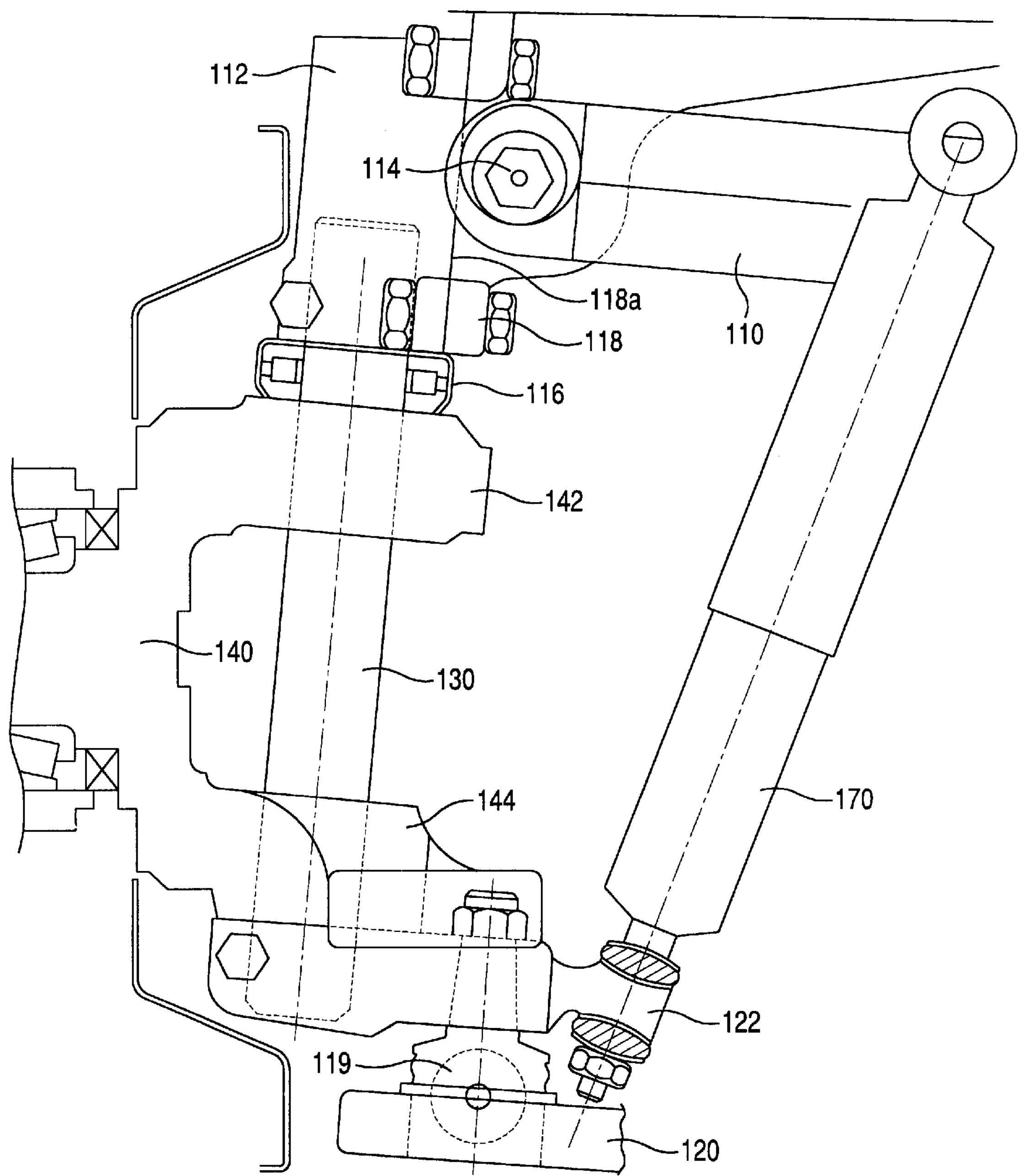
FIG. 5 is an enlarged view of the knuckle, upper kingpin support, lower kingpin support and a portion of the associated upper and lower control arms.
Figure 6:
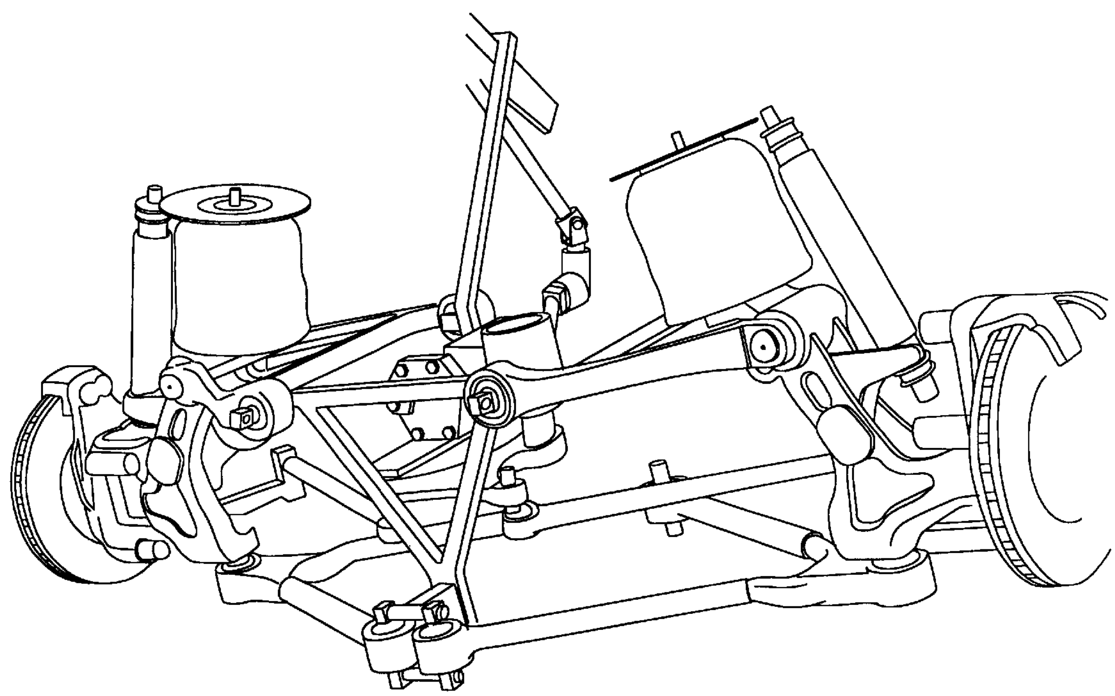
FIG. 6 is a perspective view of a conventional kingpin independent front suspension including an upright and a ball joint lower control arm pivot.

With reference to FIG. 3, a partial section of the suspension system 100 of the invention is shown comprising an upper control arm 110 connected to the upper kingpin support 112 through a tapered roller bearing outboard pivot connection 114 (see FIG. 5), a lower control arm 120 connected to the lower kingpin support 122 through a ball joint outboard pivot connection 124 (see ball joint 119 in FIG. 5). A thrust bearing 116 is disposed between the upper kingpin support 112 and the upper knuckle leg 142. The kingpin 130 extends from the upper kingpin support 112 through the upper knuckle leg 142 and lower knuckle leg 144 of knuckle 140 to the lower kingpin support 122. The upper kingpin support 112 is formed with an upper kingpin support having a mounting surface **112*a*** disposed above said upper control arm.

A tie rod 150 is connected to and extends from the tie rod arm 146 formed on the knuckle 140. The knuckle 140 is also provided with a spindle 148 to which the wheel (not shown) is mounted. Both the spindle 148 and tie rod arm 146 are formed in a conventional manner known in the art. Likewise, an anti-roll bar and radius rod track bar 160 is affixed to the lower control arm 120 through a bushing in a manner that is known in the art.

Figure 4:
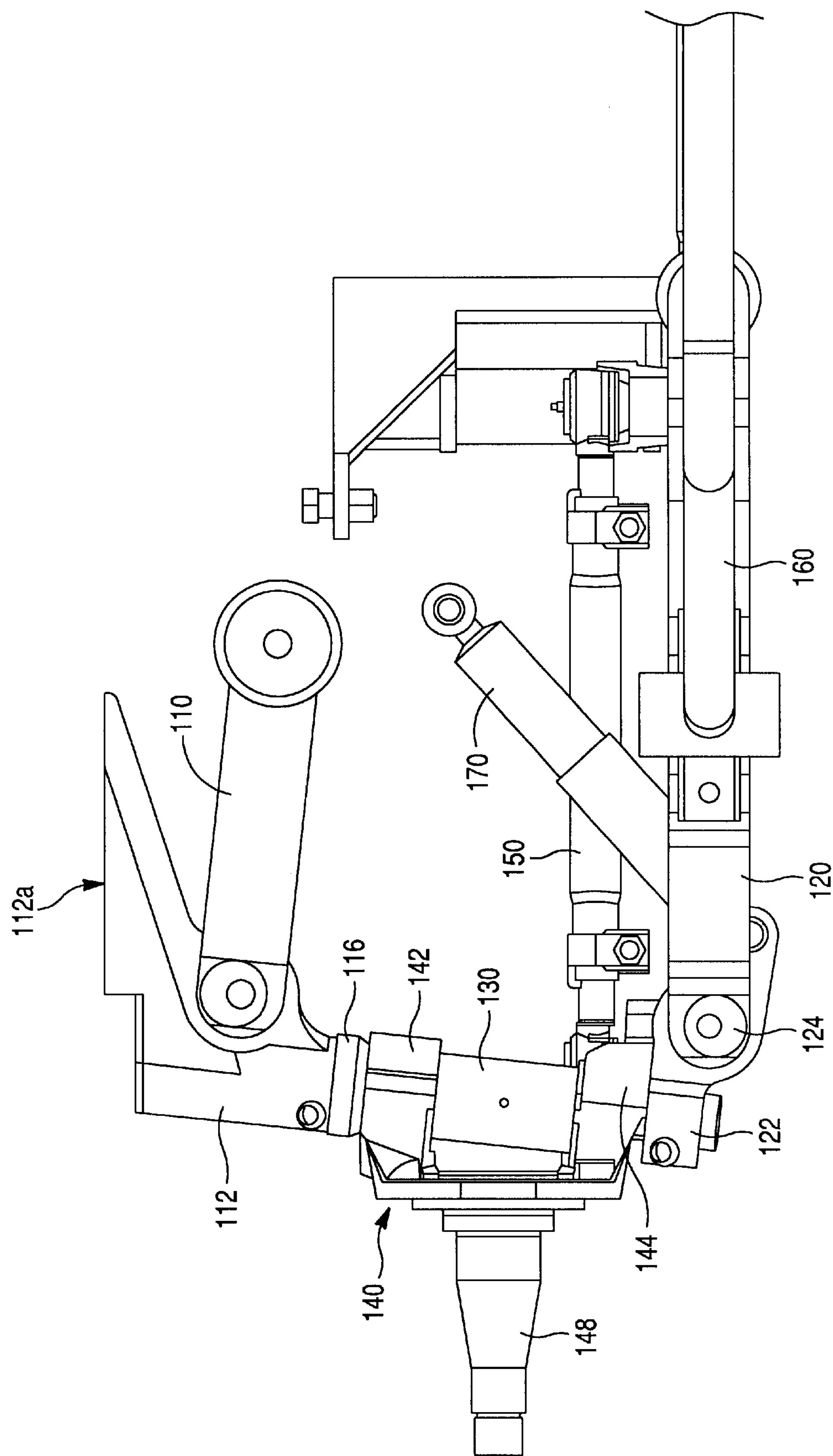
FIG. 4 is a front view of the independent front suspension system shown in FIG. 3.

In the embodiment of FIGS. 3 through 5, a resilient damper strut 170 extends from the vehicle frame (not shown) to the lower kingpin support 122 or lower control arm 120.

Referring to FIG. 5, an enlarged view of the knuckle 140 provides a view of the bolted joint 118 that allows the caster angle to be changed to tune the suspension system of the invention. As shown in FIG. 5, the upper kingpin support member 112 is connected to the knuckle 140 through the bolted joint 118 separated at line **118*a* and the lower control arm 120 is attached to the lower kingpin support member 122 through the ball joint 119**. The upper and lower control arm relative horizontal position in the side view provides an adjustable kingpin caster angle as opposed to the fixed caster angle provided in a typical kingpin steer independent front suspension axle. This concept allows the angle to be tuned to suit each application of the axle without retooling the components and adjusted in the field.

Figure 7:
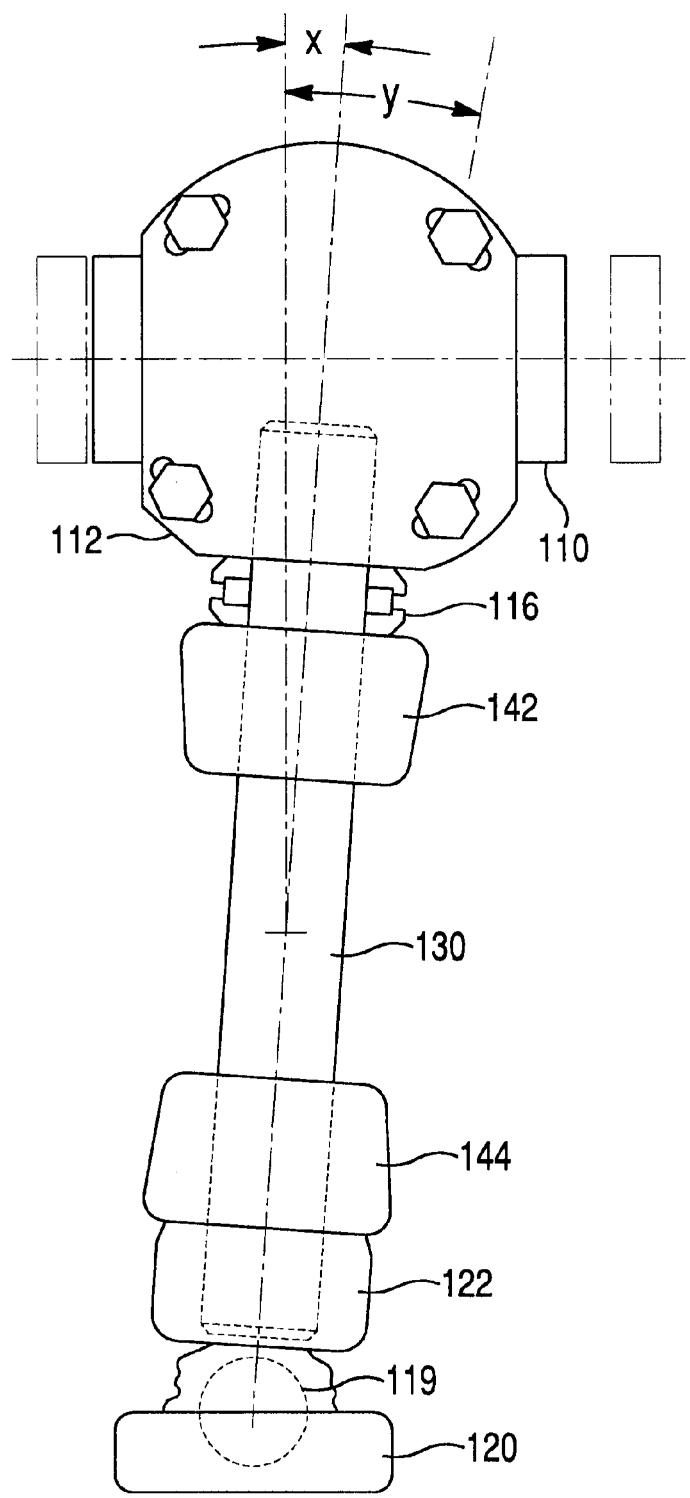
FIG. 7 is a partial side view of the front suspension system according to this invention showing the adjustable kingpin caster angle.

As shown in FIG. 7, the caster angle may be adjusted at the bolted connection 118 whereby the bolts 118b may be loosened to permit an adjustment of the caster angle as the upper and lower control arm horizontal relative position is varied. Angular position 'x' shows a nominal caster angle, while angular position 'y' shows a maximum cater angle adjustment. The upper control arm 110 is also shown in a nominal position (solid lines) and a maximum position (dotted lines). The provision of the ball joint 119 is once again noted.

While the present invention has been shown and described with respect to the preferred embodiments and best mode known to the inventors, it will be understood that various changes in form and detail may be made herein without departing from the spirit and scope of the instant invention. For example, the preferred embodiment of the present invention locates the lower kingpin support 122 below the lower knuckle leg 144; however, the lower kingpin support 122 may alternately be disposed between the upper and lower knuckle legs 142, 144, 242, 244. Likewise, the bolted connection 118 between the upper kingpin support and the kingpin may take many different forms to provide the caster and/or anti-dive angle adjustment set forth by this invention.

What is claimed is:

1. A heavy duty independent suspension system for a vehicle, said suspension system comprising:

a steer knuckle comprising upper and lower knuckle legs and a spindle adapted to mount a wheel on the steer knuckle;

a kingpin rotatably affixed to said steer knuckle and extending from said upper knuckle leg to said lower knuckle leg;

an upper kingpin support connecting said kingpin to an upper control arm extending from a vehicle frame, said upper kingpin support having a mounting surface disposed above said upper control arm; and a lower kingpin support connecting said kingpin to a lower control arm extending from said vehicle frame, wherein said upper and lower kingpin supports are mounted to said knuckle through said kingpin.

2. The suspension system of claim 1, further comprising a bolted joint connection between said upper kingpin support and said kingpin, said bolted joint connection permitting caster angle changes to thereby enhance a performance of said suspension system.

3. The suspension system of claim 1, further comprising a thrust bearing disposed between said upper kingpin support and said upper knuckle leg.

4. The suspension system of claim 1, further comprising a tapered roller bearing disposed between said upper kingpin support and said upper control arm.

5. The suspension system of claim 1, further comprising a ball joint connection disposed between said lower kingpin support and said lower control arm.

6. The suspension system of claim 1, further comprising a resilient damper member extending from said vehicle frame to said lower kingpin support.

7. The suspension system of claim 1, wherein said lower kingpin support is disposed below lower knuckle leg, thereby positioning said lower kingpin support opposite said upper knuckle leg with respect to said lower knuckle leg.

8. A heavy duty independent suspension system for mounting a wheel of a vehicle to a vehicle frame structure, said suspension system comprising:

a steer knuckle comprising upper and lower knuckle legs through which is rotatably mounted a kingpin and adapted to connect the wheel spindle to said vehicle frame structure and a spindle adapted to rotatably mount a wheel on the steer knuckle;

an upper kingpin support connecting said kingpin to a pivoting upper suspension control arm, and a lower kingpin support connecting said kingpin to a pivoting lower suspension control arm, wherein said kingpin extends from said upper kingpin support through said upper and lower knuckle legs and to said lower kingpin support, and a bolted joint in said upper kingpin support, said bolted joint connection permitting caster angle changes to thereby enhance a performance of said suspension system.

9. The suspension system of claim 8, further comprising a thrust bearing disposed between said upper kingpin support and said upper knuckle leg.

10. The suspension system of claim 8, further comprising a tapered roller bearing disposed between said upper kingpin support and said upper control arm.

11. The suspension system of claim 8, further comprising a ball joint connection disposed between said lower kingpin support and said lower control arm.

12. The suspension system of claim 8, further comprising a resilient damper member extending from said vehicle frame to said lower kingpin support.

* * * * *